UNITED STATES PATENT OFFICE.

OTTO CHRISTIAN HAGEMANN, OF NEW YORK, N. Y.

PROCESS OF SEPARATING TANNIN FROM OTHER BODIES.

SPECIFICATION forming part of Letters Patent No. 510,132, dated December 5, 1893.

Application filed April 3, 1893. Serial No. 468,929. (No specimens.)

*To all whom it may concern:*

Be it known that I, OTTO CHRISTIAN HAGEMANN, a subject of the Queen of Great Britain, now residing in the city of New York, State of New York, have invented a new and useful Improvement in Processes of Extraction or Purification of Tannin, of which the following is a full, true, and correct description.

According to the present processes of extracting tannin from raw materials the solvents employed cause a final separation with the tannin of many impurities, such as coloring matters, ellagotannic, and similar acids, gallic acid, chlorophyll, fatty and waxlike substances, &c., derived from the raw material. It has either been impossible to remove such impurities, or the further purification of the tannin has been very difficult.

I have discovered that amyl alcohol (fusel oil) will dissolve from the raw material or impure tannin large quantities of tannin, but that other bodies, such as coloring matters and the heterogeneous tannins, remain undissolved; thus amyl alcoholic extractions from nut-galls containing even as high as thirty or forty per cent. of tannin are of remarkably light color. From other materials, such as sumac, divi-divi, and myrobolans, the amyl alcohol takes up only the light colored tannin. From low grade technical tannins as made by the present methods, pure tannin can by this method be readily extracted. From the darkest tannin liquid (tannin extract) a light colored and quite pure tannin is obtained; in fact, amyl alcohol acts as a specific separator of the tannin from a certain class of impurities. But it is likewise true that amyl alcohol will dissolve chlorophyll and certain fatty or waxlike bodies, as, also, some gallic acids; but I have discovered that these bodies are very easily removable from amyl alcohol solution. From a highly concentrated amyl alcohol solution of tannin, water will extract the tannin in a state of great purity leaving the other impurities behind. I have further discovered that tannin can be easily precipitated from this amyl alcohol solution by an addition of benzine, or similar hydro-carbon or solvent that will mix with amyl alcohol, but in which tannin is insoluble.

Upon the above facts my improved process of separating tannin is based.

In carrying out my process practically, I proceed as follows: I macerate or digest finely disintegrated nut-galls, sumac or other raw materials containing tannin thoroughly with amyl alcohol. I prefer to keep the temperature of the solvent at about 60° or 70° centigrade, at which temperature rapid progress is made in the extraction and the product remains of a good color; I may, however, proceed at a higher temperature if desired, going even to 120° centigrade and above, at which temperature the tannin seems to remain unchanged but becomes somewhat darker. On the other hand, the extraction may be carried out at an ordinary temperature, say 15° centigrade if the amyl alcohol used contains a small and sufficient percentage of water. In this case I prefer to use amyl alcohol containing about one half the proportion of water soluble in same. Also at higher temperatures the extraction may advantageously be carried out with the amyl alcohol in a slightly watered condition. Having obtained my tannin solution, I may filter the solution thus obtained and concentrate the same in a vacuum, and simultaneously recover the amyl alcohol which may be repeatedly used. If, however, I desire to still further purify my tannin, I separate the same from its amyl alcohol solution by dissolving it in water, which will leave certain of the impurities in the amyl alcohol together with a small percentage of tannin. In this case, I add to the concentrated and cooled amyl alcohol solution of tannin several times (say three times) its volume of cold water when a rapid separation of tannin occurs, the tannin going into the solution of water and leaving the amyl alcohol. In this case the amyl alcohol liquid rises to the surface of the water, and gathers there as a well defined upper layer. The fact is that under these conditions the small amount of amyl alcohol in the original concentrated extract can retain but little tannin in the presence of water. I separate, of course, the supernatant amyl alcohol solution from the water and may return the amyl alcohol for subsequent separations with other bodies of water, or may still further concentrate this withdrawn solution and effect further water separations. I take my water solution of tannin, concentrate the same in a vacuum, and finally dry the tannin if I desire it in that condition.

Instead of using the raw materials directly and subjecting them to the amyl alcohol I may use a concentrated watery solution of impure tannin (tannin extract); in this case I mix intimately with the aqueous tannin solution about an equal amount of amyl alcohol, which latter takes up a large amount of tannin from the aqueous solution or tannin extract, which should previously have been concentrated to the consistency of a sirup. The method of obtaining the tannin from this amyl alcohol solution may be as above described.

When it is desired to obtain the tannin from the amyl alcohol solution directly by precipitation, I proceed as follows: I take said solution of moderate strength, containing say not more than twenty-five per cent. of tannin; I add thereto, under agitation, say from one to two volumes of benzine, or any such hydrocarbon or solvent, which, while readily mixable with amyl alcohol, will not dissolve tannin. I prefer such solvents the boiling point of which is rather remote from that of amyl alcohol, thereby more readily separating the solvents after use. The tannin thus precipitated is collected and treated again with other solvents, such as benzine, for the removal of amyl alcohol, and finally dried. It will be understood that in this case such bodies as chlorophyll, fats and wax remain in the mixed solution, while the tannin and some of the gallic acid present precipitates.

If it is desired to be rid of the gallic acid in the precipitated tannin, that may be separated, as before described, either, for instance, by the addition of water to the mixed solution of benzine and amyl alcohol whereby practically only the tannic acid is dissolved, or by taking the dried tannin and dissolving it in several times its weight of water, the gallic acid remaining practically undissolved, and separating the tannin solution by filtration.

It is to be understood, of course, that when I speak of amyl alcohol, I do not necessarily use this in a pure condition, but other bodies not injurious to the process may be mixed with it. I prefer, of course, to use the amyl alcohol in a reasonably pure condition.

What I claim as my invention, and desire to secure by Letters Patent, is—

1. The process herein described of separating tannin from materials containing the same, which consists in dissolving it in amyl alcohol, substantially as described.

2. The process herein described of separating tannin from other bodies, which consists in dissolving the same in amyl alcohol, and subsequently separating the tannin, substantially as described.

3. The process herein described of separating tannin from other bodies, which consists in dissolving the same in amyl alcohol, and subsequently separating the tannin by adding benzine or an equivalent body, substantially as described.

4. The process of separating tannin from other bodies which consists in making a solution of tannin in amyl alcohol, separating the amyl alcohol from the tannin, and finally recovering the tannin, substantially as described.

In testimony whereof I have signed my name to this specification in the presence of two subscribing witnesses.

OTTO CHRISTIAN HAGEMANN.

Witnesses:
HARRY COUTANT,
DAVID A. SMITH.